United States Patent [19]
Hamstra

[15] 3,693,047
[45] Sept. 19, 1972

[54] APPARATUS FOR PROTECTING ELECTRICAL DEVICES
[72] Inventor: David C. Hamstra, Clinton, Iowa
[73] Assignee: General Electric Company
[22] Filed: Sept. 28, 1971
[21] Appl. No.: 184,564

[52] U.S. Cl.................317/13 B, 219/501, 307/117, 317/13 C, 317/33 SC, 317/40 R, 318/472, 321/13, 337/107
[51] Int. Cl..............................................H02h 5/04
[58] Field of Search .....317/13 B, 13 C, 33 SC, 40 R, 317/41; 318/472; 307/117; 321/12, 13; 219/501; 337/107

[56] References Cited
UNITED STATES PATENTS

| | | | |
|---|---|---|---|
| 3,303,391 | 2/1967 | Kitami | 317/41 |
| 3,484,651 | 12/1969 | Riley | 317/33 SC |
| 3,522,480 | 8/1970 | Routh et al. | 317/41 X |
| 3,575,645 | 4/1971 | Doversberger | 317/40 R |

Primary Examiner—James D. Trammell
Attorney—Joseph B. Forman et al.

[57] ABSTRACT

Apparatus for protecting electrical devices, particularly permanent magnet motors and components for controlling the speed of such motors, such as solid state elements, against excessive current and excessive temperature. A permanent magnet motor utilized for driving an electric appliance, such as a blender, is controlled by a circuit which includes a silicon-controlled rectifier in series with the motor. The SCR is mounted in heat transfer relationship with one side of a heat sink composed of a material having good heat conductivity. A thermally-actuated switch, connected in series circuit with the motor and the SCR, is positioned in heat transfer relationship with the opposite side of the heat sink. The heat sink is constructed so that its thermal mass may be easily modified to make the temperature of the heat sink correspond generally to the temperature of the motor, at least in the range of temperatures where protection is to be provided. The thermally-actuated switch is responsive to the heat sink temperature to protect the electrical devices against excessive temperature of the motor or of the SCR, and also is responsive to current through the resistance of the switch to protect against excessive current surge.

8 Claims, 6 Drawing Figures

PATENTED SEP 19 1972

INVENTOR
DAVID C. HAMSTRA

ATTORNEY

INVENTOR
DAVID C. HAMSTRA

ATTORNEY

INVENTOR
DAVID C. HAMSTRA

ATTORNEY

INVENTOR
DAVID C. HAMSTRA

ATTORNEY

APPARATUS FOR PROTECTING ELECTRICAL DEVICES

This invention relates to apparatus for protecting electrical devices, and more particularly to apparatus for protecting the motor and solid state control element of an electrical appliance against excessive temperature and current.

DESCRIPTION OF THE PRIOR ART

In connection with many electrical devices, for example electric appliances, it is necessary to include provision for protecting components, such as the motor and control, against damage from overheating or excessive current. For example, in the case of electric appliances such as blenders which include blades for chopping food, the appliance may be potentially severely overloaded and damaged if solid food placed in the blender blocks the rotation of the blades, resulting in a "locked rotor" mode of the motor. This condition causes the motor to draw an excessive current, thereby generating excessive heat in the motor. If this is continued for more than a very short time, the motor may be severely damaged. Moreover, the drawing of excess current by the motor may also endanger elements of the control circuit of the motor. For example many such motors are controlled by a circuit including a solid state device, such as a silicon-controlled rectifier, and excessive current through the motor and hence through the SCR may result in damage to or destruction of the solid state device.

In appliance motors of the series alternating current type, it has been possible to place a thermally-actuated switch, such as any of a number of switches including a heat-responsive bimetallic element, in direct contact with the motor, for example, in contact with the field winding, so as to be immediately responsive to excessive temperature thereof.

In the case of appliances using a permanent magnet direct current motor instead of a series alternating current motor, the field windings are replaced by a permanent magnet. The windings which are subject to damage upon overload and excessive heat are located on the rotor. It is impracticable to place the thermally-actuated switch in contact with the moving rotor and, even if it were possible to do so, it would tend to create an imbalance in the rotor, particularly in the case of high speed motors, such as blender motors. The problem of proper protection of such motors against overload and excessive current and heat has therefore been a difficult one.

Moreover, the solid state device employed in controlling the supply of direct current to such motors to control the speed thereof is also subject to damage from excessive current resulting from an overload condition and it is necessary to provide suitable protection to prevent such damage or alternatively to use a higher duty, more expensive solid state device.

By the present invention, provision is made for accurately sensing excessive temperatures of the motor and opening the circuit before damage can occur, without the necessity of positioning a temperature responsive device in direct contact with the motor itself. Provision is made in a simple manner for obtaining a temperature response at a position displaced from the motor but which, through the arrangement of this invention, accurately tracks the motor temperature, or at least corresponds approximately to the motor temperature in the range of temperatures where damage could occur.

Moreover, there is combined in this temperature responsive apparatus, provision for sensing the temperature of the solid state device and insuring interruption of the circuit before that temperature can reach the point of damaging the solid state device.

All of this accomplished in a simple and economical manner, and, moreover, in a manner which facilitates simple alteration of the protective apparatus to provide for accurate response with respect to any electrical devices of this type which are to be protected against excessive temperature and current.

Accordingly, it is an object of this invention to provide an improved apparatus for protecting a motor and a control element from damage resulting from excessive heat and current.

It is another object of this invention to provide improved apparatus for achieving such protection without necessity of positioning a temperature responsive element in contact with the motor itself.

It is a further object of this invention to provide protective apparatus of this type which includes provision for easily modifying the apparatus to insure response, at a location displaced from the motor, to a temperature which corresponds generally with that of the motor.

It is still a further object of this invention to provide in a single combined protective apparatus means for protecting both a motor and a control element therefor against both excessive temperature and excessive current.

SUMMARY OF THE INVENTION

In carrying out the objects of this invention in one form thereof, there is provided apparatus for protecting electric devices against excessive current and temperature. The invention is particularly applicable for protecting permanent magnet direct current motors and solid state control elements therefor. The solid state control element, which may be a silicon-controlled rectifier (SCR) is arranged in series with the motor. A heat sink, constructed of a material of good heat conductivity, is disposed in a position displaced from the motor, and the SCR is mounted in heat transfer relationship with one side of the heat sink. A thermally-actuated switch is mounted in heat transfer relationship with the opposite side of the heat sink so as to be responsive to heat transmitted to the heat sink from the SCR. The heat sink is constructed so that its thermal mass may be easily modified to cause the temperature of the heat sink to correspond generally to the temperature of the motor, at least in the range of temperatures where protection is to be provided. The thermally-actuated switch responds to the heat sink temperature to open the circuit of the motor and the SCR to protect these electrical devices against damage because of excessive current and temperature conditions.

DESCRIPTION OF THE DRAWINGS

The above-mentioned and other features and objects of this invention and the manner of attaining them will become more apparent and the invention itself will be best understood by reference to the following description of a preferred embodiment of the invention, taken in conjunction with the accompanying drawings, wherein.

DESCRIPTION OF THE PREFERRED EMBODIMENT

Figure 1:
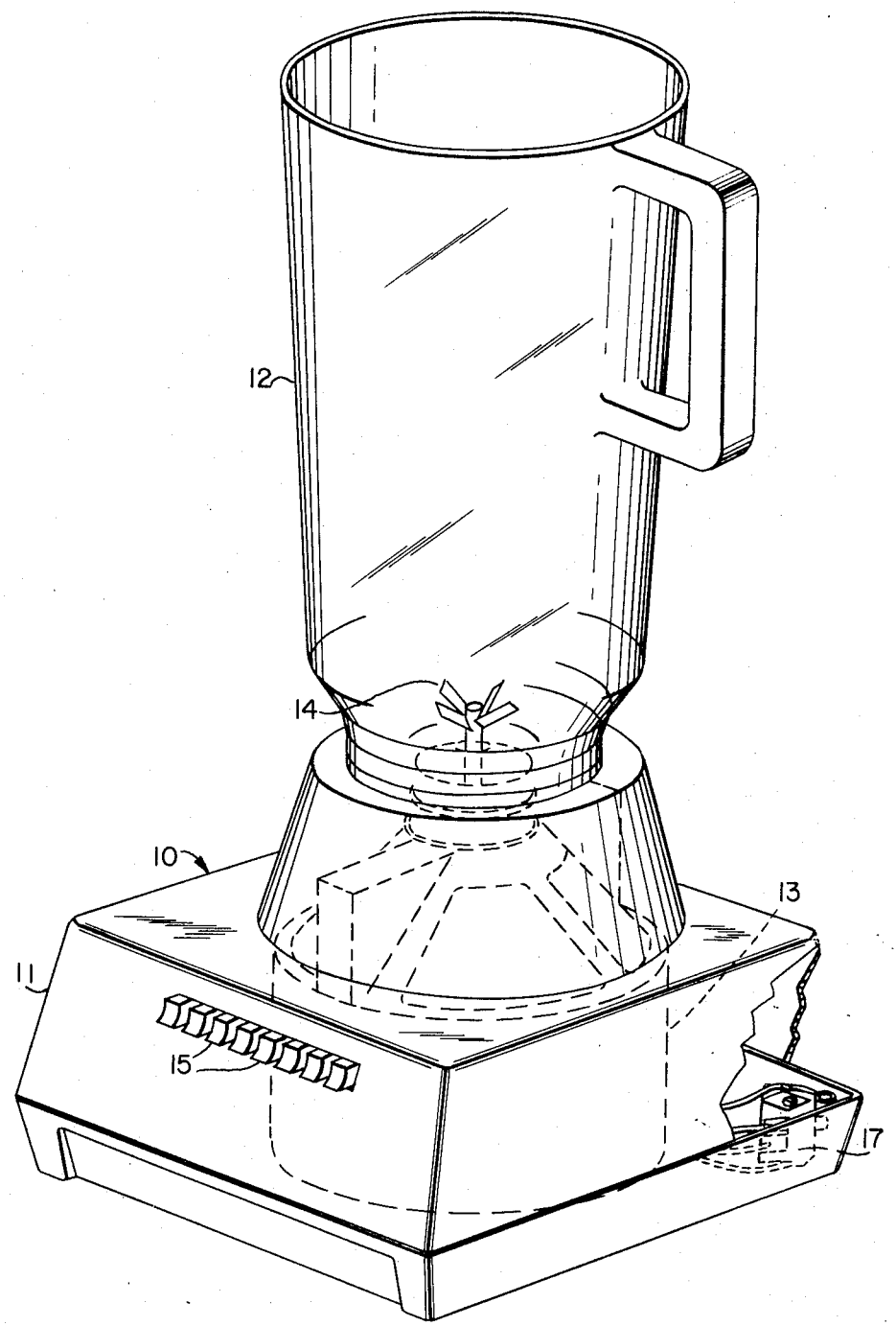
FIG. 1 is a perspective view, partly broken away, of a blender incorporating one form of this invention.
Figure 2:
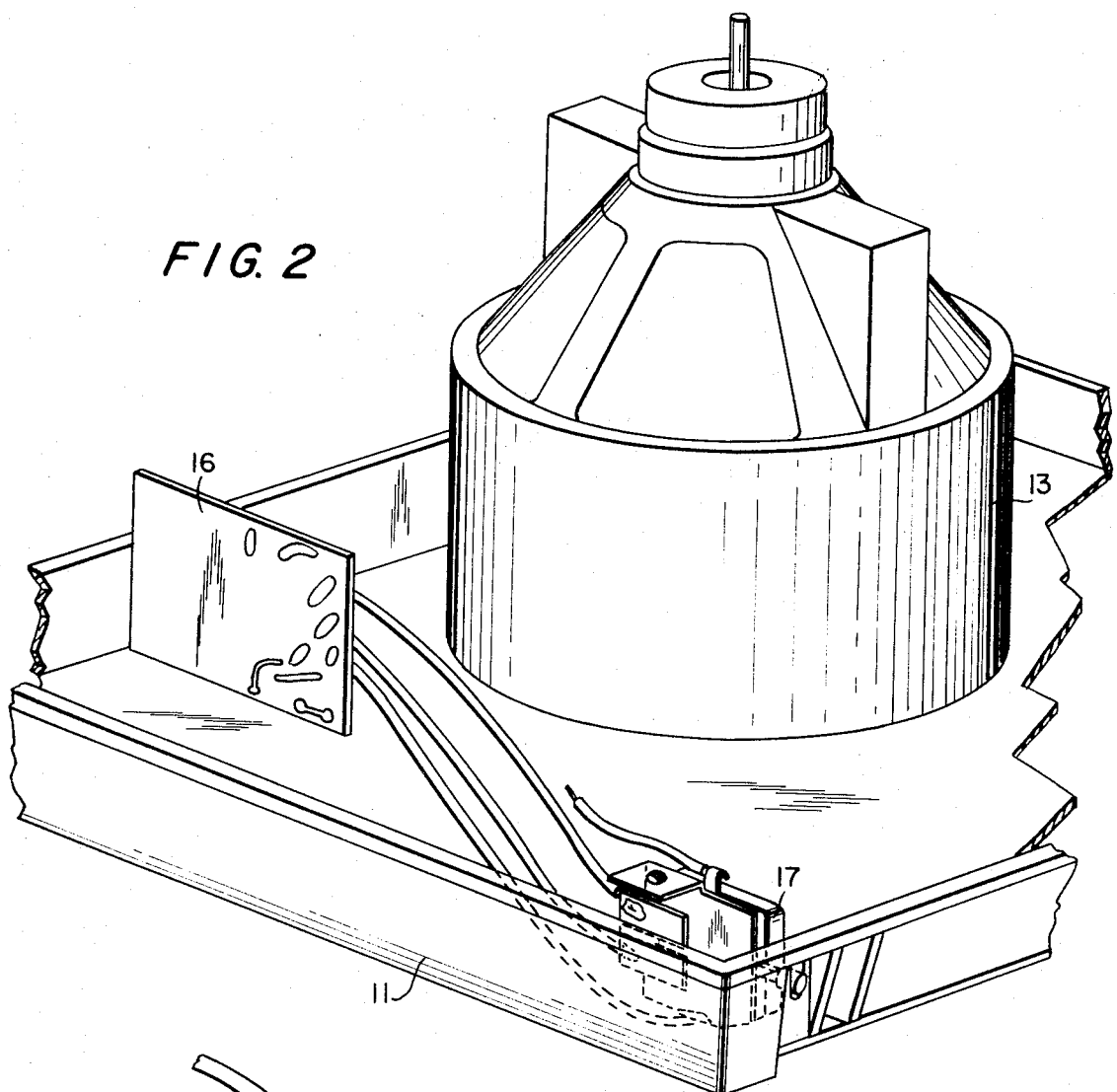
FIG. 2 is an enlarged view of a portion of FIG. 1 showing the protective apparatus in greater detail.

Referring now to FIGS. 1 and 2, there is shown a blender 10 which includes a base housing 11 and a container 12 mounted on the housing for receiving solids or liquids. A motor 13 is positioned within the housing and is arranged in a conventional manner to engage and drive blades 14 positioned in the lower portion of the container 12.

A blender is normally intended to be operated over a range of fairly high speeds. In the particular embodiment shown a permanent magnet direct current motor is employed and the blender includes a plurality of push button switches 15 in the base housing for setting the blender to any desired speed. These push buttons control the resistance in a control circuit, as will be described further in connection with the circuit shown in FIG. 3. Also positioned within the base housing is a circuit board 16, which includes substantially all of the elements of the control circuit shown in FIG. 3, and the protective apparatus 17 which forms the subject matter of this invention.

Figure 3:
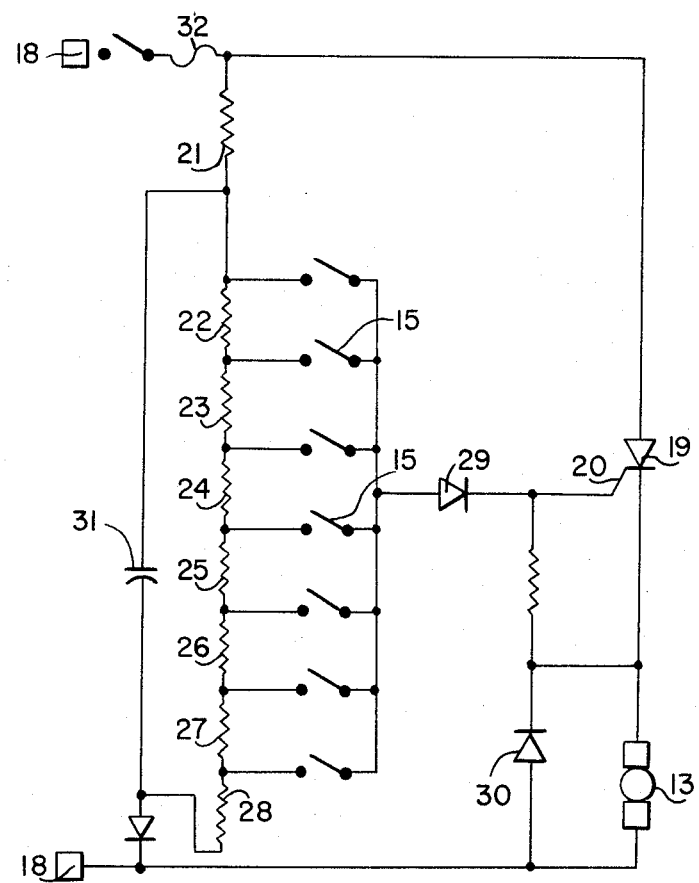
FIG. 3 is a diagram of the circuit for controlling the operation of a motor used to drive the blender.

To provide direct current to the rotor windings of the motor 13 from a conventional household alternating current source, and to control the speed of the motor, the control circuit shown in FIG. 3 is provided. The circuit includes terminals 18 for connection to any suitable alternating current source. A solid state device 19 is connected in series with the motor 13. In the particular form shown, the solid state device constitutes a silicon-controlled rectifier (SCR), connected in series with the motor 13 and controlled through a gate 20, to provide half-wave rectified power to the motor. It will be understood that other suitable solid state devices, such as transistors, triacs, etc., could be incorporated in the circuit in lieu of the SCR. Triggering of the SCR is accomplished by developing a voltage across the gate-cathode junction sufficient to trigger the SCR into conduction. A reference voltage is applied to the gate 20 from a voltage divider comprising a plurality of resistances 21–28. The reference voltage applied to the gate 20, is determined by closing any desired one of the push button switches 15, so as to connect the gate 20 to the selected point on the voltage divider formed by the resistances 21–28. This reference voltage determines the speed setting of the motor 13. In operation, if the back generated voltage of the motor 13 exceeds the reference voltage thus set, the gate-cathode junction remains reverse-biased and the SCR will not trigger. Conversely, if the back generated voltage of the motor falls below that of the reference voltage, the gate is forward-biased and the SCR is turned on to provide power to the motor. In this manner, the speed of the motor is maintained at any speed determined by the selected one of the push button switches 15. A diode 29 prevents AC power from the terminals 18 from reverse biasing the gate 20 during the negative half cycle. Diode 30 serves as a commutating diode across the motor 13. A capacitor 31 is provided to smooth performance at low speeds, that is, to filter noise and provide delay.

In order to provide protection for the motor and the SCR, a thermally-actuated switch, shown schematically at 32, is incorporated in series with the SCR and the motor. This switch and its physical arrangement in the protective apparatus is described in more detail in connection with the description of the protective apparatus illustrated in FIGS. 4 and 5.

It is necessary to provide for an electrical appliance, such as a blender, suitable protection against excessive current and against overheating caused by an overload of the apparatus. For example, heavy material such as chunks of carrots placed in the container 12, may cause the blender blades 14 to jam, resulting in a "locked rotor" condition of the motor. The attendant excessive current through the motor and the SCR could result in the burning out of either or both unless suitable protection is provided. Also, a lesser overload continued for a short period of time may also result in excessive heating of the motor and of the SCR and damage thereto. The protective apparatus of this invention is arranged to provide protection under both of these conditions and to provide such protection for both the motor and SCR.

In many electric appliances a series alternating current motor is employed, and it is possible to provide a thermally responsive switch in direct association with the field windings of such a motor. Thus, the switch can be arranged to be responsive directly to any excessive temperature of the motor to interrupt the circuit before damage to the motor can occur. In the present apparatus, however, it is contemplated that a permanent magnet direct current motor will be employed, and in such a motor the windings, which are the hot part of the motor and which are subject to damage upon excessive temperature, are located on the rotor. It is impracticable to place a conventional temperature responsive switch on the rotor in direct association with the windings, and moreover, such positioning would result in imbalance of the rotor. This problem is overcome by the present invention by providing the protective apparatus which, while displaced from actual contact with the motor itself, still provides a temperature to be sensed which closely tracks that of the motor. As seen in FIGS. 1 and 2, the protective apparatus 17 is positioned, like the motor 13, within the base housing 11, but is disposed adjacent the outer wall of the housing at a point displaced from the motor. It will be noted that the positioning of this protective apparatus in the housing at the point shown makes the protective apparatus subject to the same ambient conditions as the motor itself.

Figure 4:
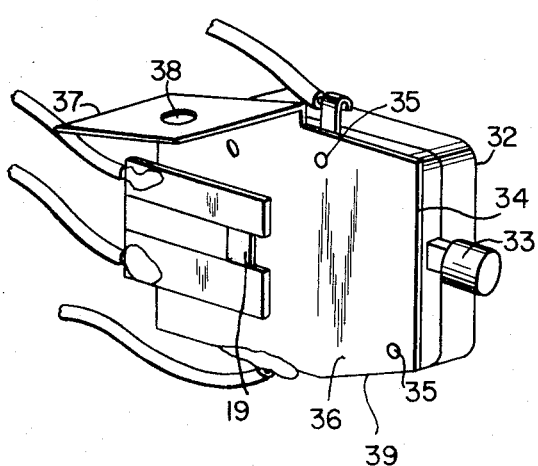
FIGS. 4 and 5 are perspective views of opposite sides of the protective apparatus.
Figure 5:
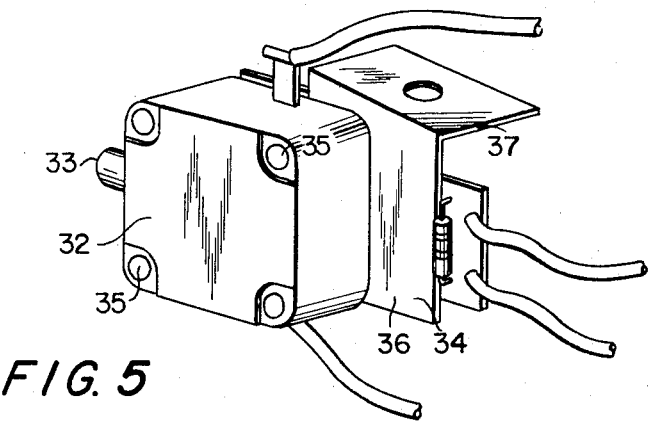

Referring now to FIGS. 4 and 5, the thermally-actuated switch, illustrated schematically at 32 in FIG. 3, is shown in structural representation. The switch is intended to be a conventional one, employing a bimetallic element having internal resistance so that the bimetallic element is heated and actuated under excessive current conditions. Since such conventional switches are well-known, and since the details of internal structure are unnecessary for an understanding of this invention, such details of the internal structure are not shown. The switch includes a push button 33 for manually resetting the switch, should the switch be actuated under overload conditions. The switch is mounted in direct heat transfer relationship with one face of a heat sink 34. More specifically, the switch is mounted on the heat sink by means of a plurality of rivets 35. The SCR, which is shown schematically at 19 in FIG. 3, and physically at 19 in FIG. 4, is positioned in direct heat transfer relationship with the opposite face of the heat sink 34 and approximately in the center of that face. The heat sink 34 is made of a material of a high heat conductivity, so as to conduct heat rapidly from the SCR. In the form shown the heat sink is made of copper plated with tin. The temperature of the heat sink is sensed effectively by the thermally-actuated switch 32 because of its direct heat transfer relationship therewith.

Structurally the heat sink includes a generally rectangular flat plate 36, and a flange 37 extending generally at right angles to the plate 36. The flange 37 has an opening 38 therein, which is intended to receive a self-tapping screw for mounting the protective apparatus on a stud formed in the base housing 11.

It has been mentioned earlier in this specification that with a permanent magnet motor it is impracticable to mount a thermally-actuated switch in association with the hot part of the motor since the windings which are subject to damage upon overloading conditions are on the rotating portion of the motor. By this invention this problem is overcome by causing the heat sink, which is displaced from the motor, to track the temperature of the motor, or in any event to track the temperature of the motor in the range of temperatures where protection is to be provided. Moreover, this is accomplished in a simple manner so that any necessary alteration to adapt the protective apparatus for use with a particular type of motor may be accomplished quickly and easily.

In the particular form of the invention shown, the heat sink receives heat from the SCR and the SCR, being in series with the motor 13 is subjected to the same current as the motor. If the current through the motor increases, for example, under overload conditions, there is a similar increase in the current through the SCR. The resultant increased temperature causes greater heat to be transferred to the heat sink. It will be apparent, therefore, that the temperature of the heat sink will be related to the temperature of the motor. The actual increase in temperature of the heat sink for a given current through the motor and the SCR, is dependent upon several potentially variable factors, including its thermal mass, surface area, material and configuration. The material is chosen as one of high conductivity so as to conduct heat rapidly from the SCR, and the configuration is also chosen to promote quick heat transfer from the SCR. The amount of surface area will, of course, affect the rate of heat dissipation from the heat sink to the surrounding area. The predominant factor, however, in determining the temperature of the heat sink under any particular conditions is the thermal mass thereof.

In accordance with this invention, the thermal mass of the heat sink is selected so that the temperature of the heat sink closely tracks the temperature of the motor. It will be apparent that the characteristics of the heat sink must be varied for use with different types and sizes of motors, since the operating characteristics and temperatures of motors of different types and sizes will be different. In accordance with the present invention, the heat sink is constructed so that it may be modified, if necessary, in a very simple manner to cause the heat sink to track the motor temperature closely enough to provide the desired protection. It is actually only necessary that the temperature of the heat sink track, within an acceptable degree of tolerance, the motor temperature in the range of temperatures where the protection is desired; that is, the temperature of the heat sink may, without significant effect on the protection provided, depart materially from the motor temperature in the range of temperatures below the maximum safely permitted so long as the temperature of the heat sink closely approximates that of the motor when the region of maximum temperature to be permitted is reached.

Figure 6:
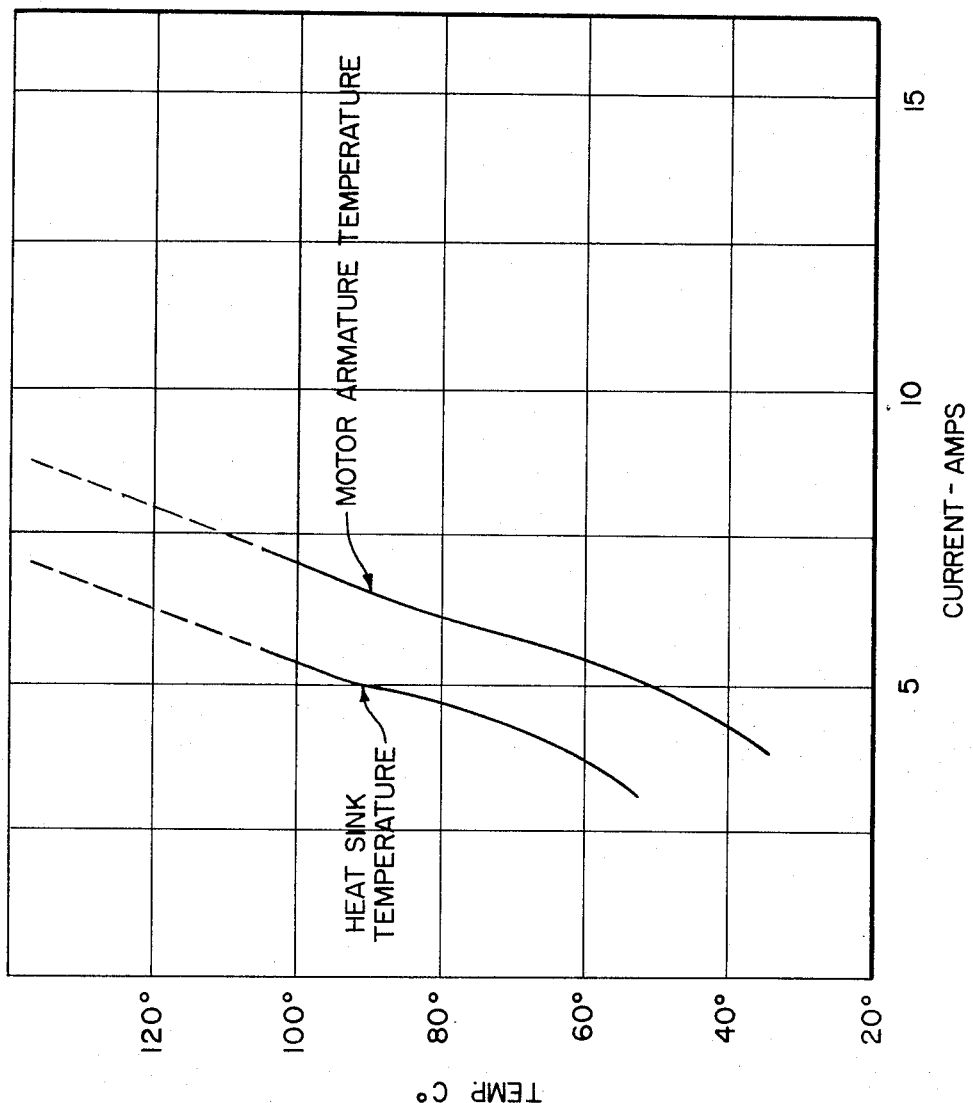
FIG. 6 is a graph comparing temperature variations.

In carrying out the invention, the protective apparatus is assembled as shown in FIGS. 4 and 5 and is connected, under conditions to be encountered in operation, to a motor of the particular type to be employed. The temperature of the motor is then measured and graphed, and simultaneously the temperature of the heat sink is measured and graphed. Graphs illustrative of this situation, one for the motor and one for the heat sink employed in the preferred embodiment, are shown in FIG. 6. It is contemplated that the maximum operating temperature of the motor and the SCR be approximately 105° C. The protective apparatus is therefore designed to interrupt the normal line power at 95° C. so as to provide for variations which may occur in the manufacture of motors and SCR's.

It can be seen from FIG. 6 that the temperatures of the heat sink employed in this embodiment approximately track the temperatures of the motor so as to provide the needed protection. If desired, further modification of the heat sink could be made, in accordance with this invention, to cause the heat sink temperatures to track the motor temperature more closely, but it has been found that the protective apparatus performs satisfactorily under the conditions illustrated in FIG. 6. Moreover, it will be noted that the heat sink temperatures shown in FIG. 6 exceed those of the motor slightly, insuring that the heat sink will cause the thermally-actuated switch to open before the temperature of the motor reaches a point where damage to the motor could occur.

If it were found, however, in an initial design of the protective apparatus for use with a particular electrical device that heat sink temperatures were, for example, sufficiently below the temperatures of the motor that the protective apparatus would not provide proper protection for the motor against overload, it is merely necessary to trim the plate 36 of the heat sink 34 to remove a portion thereof, so as to reduce the thermal mass thereof, and thereby cause the heat sink temperature to be higher for a given set of conditions.

It will be apparent that once the heat sink has been modified in this manner to cause its temperature to track approximately that of a motor of particular type and characteristics, it will then be necessary only to duplicate the material, configuration, size, etc. of the heat sink so modified and the protective apparatus will perform satisfactorily with motors of this type and characteristics used in mass production of the blenders. Thus, by a simple and easily accomplished modification the necessary characteristics of the heat sink are achieved and mass production of the protective apparatus is facilitated.

Thus, while it is not possible to recite structural details of the heat sink of general application since the characteristics will necessarily vary for use with different types and sizes of motors having different characteristics, provision is made in accordance with this invention whereby the heat sink may be modified empirically to adapt it for use with any particular type and size of motor. The structure which forms the subject matter of this invention permits this modification to be accomplished in a very simple and expeditious manner.

In carrying out this invention in one specific form thereof, a one-half horsepower permanent magnet direct current motor was employed to drive the blender. This motor included a permanent magnet field consisting of two poles of ferrite magnetic material enclosed in an outer steel casing. The armature had a lamination stack 3 inches in diameter and twenty-seven thirty-seconds inches long, and including 16 slots. The winding included 22 turns per coil of No. 22AWG wire with two coils per slot. A commutator of 32 bars was employed to relieve commutating arcing due to the high current caused by operation on half-wave rectified alternating current line voltage. The direct current resistance of the motor was approximately 2 ohms and the inductance in the order of 20 to 25 millihenries. The motor was designed to run at 7,100 rpm no load.

The SCR employed was of a conventional type comprising a reverse blocking triode thyristor with a repetitive peak voltage of 400 volts, an RMS on-state current of 8 amperes, a peak one-cycle surge on-state current of 80 amperes, and a maximum operating temperature of 105° C. A specific SCR suitable for this purpose is identified by General Electric type No. C122D.

The heat sink employed with this motor and SCR was made of copper approximately 0.032 inches thick, plated with tin. The overall dimensions of the generally rectangular plate 36 were 1.25 inches long, 1.06 inches wide at the left end, and 1.05 inches at the right end (as viewed in FIG. 4). The chamfered edge 39 constituted the hypotenuse of a triangle having sides of approximately 0.4 inches and 0.13 inches. The flange 37 had dimensions of 0.73 inch × 0.55 inch.

The thermally-actuated switch 32 included a bimetallic element and a manual reset button. The bimetallic element effected tripping of the switch at approximately 95° C. Any conventional thermally-actuated switch tripping at the desired temperature may be employed. In the particular apparatus described, a General Electric Type No. 3ARG8S2-Z was employed. The motor in normal operation drew 3 to 4 amperes. Operating in this current range, the motor would normally run 10 minutes or more before reaching the temperatures shown in FIG. 6. The switch was designed to trip in 9 seconds under an overload current of 18 amperes.

It will be apparent by this invention that an easily constructed and assembled protective apparatus is provided in which a thermally-actuated switch displaced from the motor is caused to respond to a temperature accurately simulating that of the motor through the use of a heat sink assembled in heat conductive relationship with the switch and with an SCR utilized in controlling the speed of the motor.

It will be understood that, while the principles of this invention have been described in connection with a specific embodiment thereof, this embodiment is merely illustrative of one form of the invention and the invention is not limited to the specific embodiment. For example, the protective apparatus is usable with many types of motor and variations in the size, configuration, and other characteristics of the heat sink may be made, in accordance with the guidelines set forth in the specification, without departing from the spirit and scope of this invention. It is intended, therefore, by the appended claims to cover all modifications which fall within the spirit and scope of this invention.

What is new and desired to be secured by Letters Patent of the United States is:

1. In an electrical appliance including a motor for driving the appliance and a solid state device for controlling the speed of the motor, apparatus for protecting the motor and the solid state device against overheating and overload comprising:
   a. a heat sink
   b. a thermally-actuated switch in series with the motor and the solid state device and mounted in heat exchange relationship with said heat sink
   c. said solid state device being mounted in heat exchange relationship with said heat sink whereby heat developed in said solid state device is transmitted to said switch
   d. said heat sink being selected of such thermal mass that its temperature corresponds approximately to the temperature of said motor in the region of maximum safe temperature for operation of said motor and said solid state device.

2. The apparatus of claim 1 wherein said solid state device is a silicon-controlled rectifier.

3. The apparatus of claim 1 wherein said heat sink is formed of a material of high heat conductivity for conducting heat rapidly from said solid state device.

4. The apparatus of claim 1 wherein said heat sink comprises a flat plate and wherein said switch is mounted on one face of said plate and said solid state device is mounted on the other face of said plate.

5. The apparatus of claim 4 wherein said heat sink further includes a flange extending from said plate and said flange has an opening therein for facilitating the mounting of said apparatus.

6. The apparatus of claim 4 wherein said plate is of generally rectangular configuration and said solid state device is mounted approximately in the center of said other face.

7. In an electrical appliance including a housing and a motor in the housing for driving the appliance and further including a solid state device for controlling the speed of the motor, apparatus for protecting the motor and the solid state device against overheating and overload comprising:
   a. a heat sink b. a thermally-actuated switch in series with the motor and the solid state device and mounted on said heat sink in heat exchange relationship therewith
c. said solid state device being mounted on said heat sink in heat exchange relationship therewith whereby heat developed in said solid state device is transmitted to said switch
d. said apparatus being positioned in said housing so as to be subject to the same ambient conditions as the motor
e. said heat sink including a flange having an opening therein for facilitating the mounting of said apparatus on said housing
f. said heat sink being selected of such thermal mass that its temperature corresponds approximately to the temperature of said motor in the region of maximum safe temperature for operation of said motor and said solid state device.

8. In an electrical appliance,
a. a permanent magnet direct current motor for driving the appliance
b. a solid state device in series with said motor for controlling the speed of the motor, and
c. apparatus for protecting the motor and the solid state device against overheating and overload comprising:
1. a heat sink
2. a thermally-actuated switch in series with the motor and the solid state device and mounted in heat exchange relationship with said heat sink
3. said solid state device being mounted in heat exchange relationship with said heat sink whereby heat developed in said solid state device is transmitted to said switch
4. said heat sink being selected of such thermal mass that its temperature corresponds approximately to the temperature of said motor in the region of maximum safe temperature for operation of said motor and said solid state device.

* * * * *